Patented Dec. 16, 1941

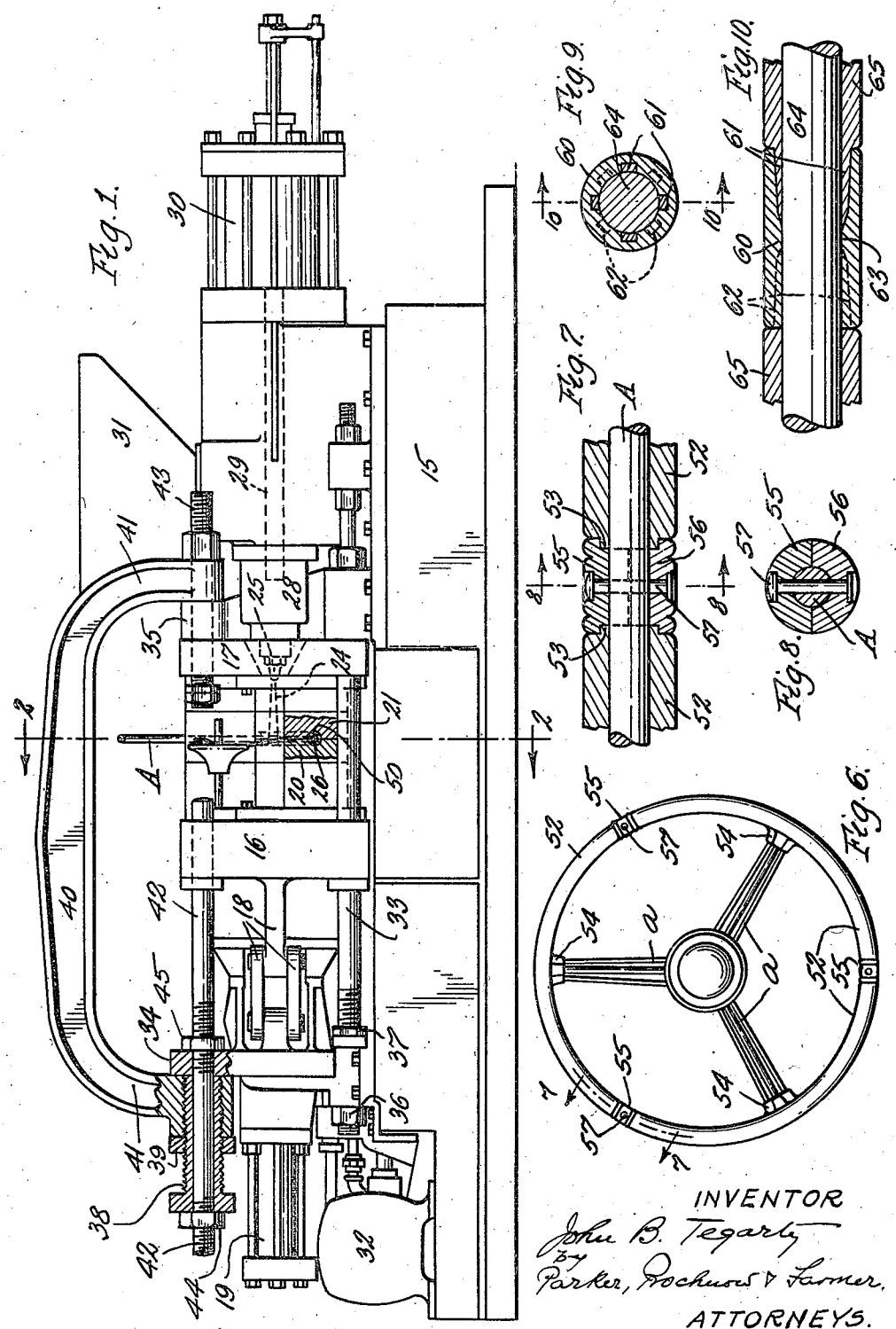

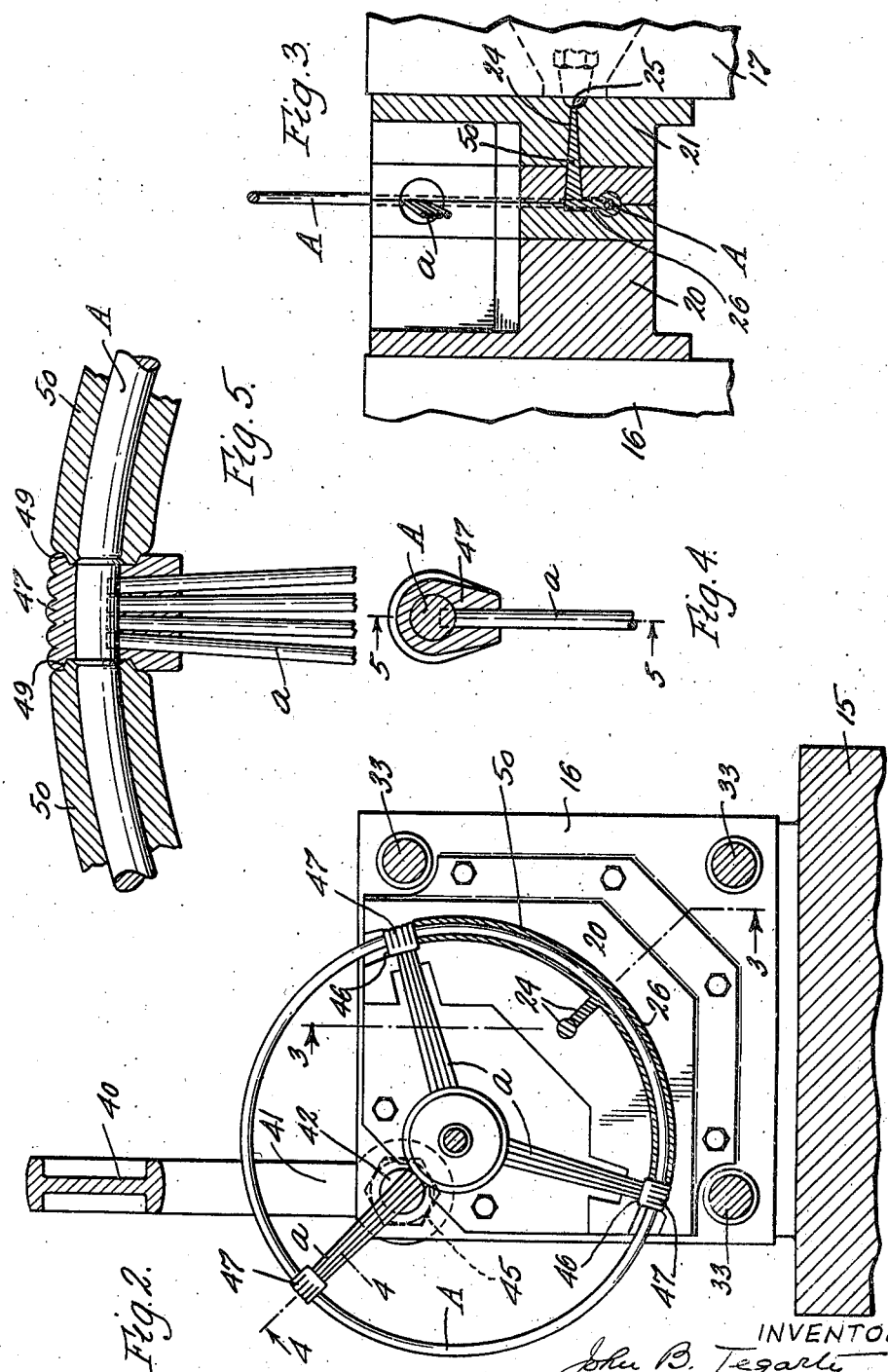

2,266,129

UNITED STATES PATENT OFFICE 2,266,129

THERMOPLASTIC MOLDING MACHINE

John B. Tegarty, Buffalo, N. Y., assignor to Sterling Injection Molding, Inc., Buffalo, N. Y.

Original application November 5, 1938, Serial No. 239,137. Divided and this application October 9, 1939, Serial No. 298,575

4 Claims. (Cl. 18—16)

This invention relates to improvements in injection or extrusion molding, in which a thermoplastic material, such for example as cellulose acetate, is plasticized by heat and forced under high pressure into a mold cavity in which it is cooled and solidified.

This application is a division of my copending application Serial No. 239,137 filed November 5, 1938.

Machines now available for use in connection with this type of molding are limited in capacity because of the characteristics of thermoplastic materials and because of conditions under which the molding must take place, so that only a relatively small quantity of thermoplastic material can be extruded and molded at one time.

One of the objects of this invention is to provide a molding machine of improved construction for use in connection with the molding of relatively large objects which would otherwise not fit into the machine. A further object of the invention is to provide an improved construction whereby a molding machine can be easily converted into a machine capable of progressively sectionally molding thermoplastic material on relatively large objects.

Other objects of this invention will appear from the following description and claims.

In the accompanying drawings:

Fig. 1 is a side elevation, partly in section, of a molding machine of improved construction embodying this invention and showing an article being operated upon by the machine.

Fig. 2 is a fragmentary transverse sectional elevation thereof, on line 2—2, Fig. 1.

Fig. 3 is a fragmentary longitudinal section thereof, on line 3—3, Fig. 2.

Fig. 4 is a fragmentary transverse section, on an enlarged scale, of an article formed on my improved machine, the section being taken on line 4—4, Fig. 2.

Fig. 5 is a section thereof, on line 5—5, Fig. 4.

Fig. 6 is a face view of another article having thermoplastic material applied thereto by my improved machine.

Fig. 7 is a section thereof, on an enlarged scale, on line 7—7, Fig. 6.

Fig. 8 is a transverse section thereof, on line 8—8, Fig. 7.

Figs. 9 and 10 are respectively transverse and longitudinal sections of a joint or connection between adjacent molded portions of another article formed on my improved machine.

Figs. 1, 2 and 3 show a standard form of molding machine for use in connection with extrusion or injection molding, the machine being changed so that it can also operate on articles of relatively large size so that thermoplastic material may be progressively sectionally molded thereon. The machine shown in the accompanying drawings includes a base 15 provided with a pair of die supporting plates 16 and 17 suitably mounted on the machine, at least one of said plates being movable toward and from the other. The die plate 15 in the construction shown is connected by means of a plurality of toggle links 18 arranged to be actuated by means of a plunger or piston arranged in a cylinder 19. When fluid under pressure is admitted into one end of the cylinder 19, the toggle links are moved toward and into dead center position for moving the die plate 16 toward the other die plate 17. 20 and 21 represent cooperating dies or molds of any desired kind suitably secured to the die plates 16 and 17, and 24 represents a passage formed in the die or mold 21 through which plasticized thermoplastic material may pass from a nozzle 25 to a cavity 26 formed in the adjacent faces of the molds or dies. The nozzle 25 receives thermoplastic material from a heating cylinder 28, the thermoplastic material being extruded by means of a plunger 29, shown in broken lines in Fig. 1, which is actuated by means of a piston (not shown) arranged in a cylinder 30. 31 represents a hopper for thermoplastic material, from which the material may be fed in necessary quantities into the heated cylinder 28, when plunger 29 is reciprocated. 32 represents a motor which operates suitable compressing means for supplying fluid under pressure to the cylinders 19 and 30, and 33 represents a plurality of tie rods or bars which connect a stationary frame member 35 with a base member or plate 34 to which one end of each set of toggle links 18 is pivoted. These tie rods or bars 33 serve to hold the parts 34 and 35 of the machine against movement away from each other during the molding operation to prevent separation of the dies or molds due to the high pressure of the thermoplastic material in the mold cavity. Generally four of these tie bars are employed, which are spaced about the mold, so that strains resulting from molding pressure are substantially equally resisted by all of these bars. Preferably the bars pass through holes in the adjustable base member 34 and are threaded and provided with nuts 36 and 37, so that the base member 34 may be adjusted toward or from the fixed frame member 35, to compensate for different thicknesses of various die or mold members which may be used in place of the mold or die members 20 and 21 shown in the drawings. The tie bars also pass loosely through holes in the die supporting plate 16, which may be guided in its movement toward and from the fixed die supporting plate 17 by these tie bars. The base member 34 carries the toggle links 18, the actuating cylinder 19 therefor and the die or mold supporting plate 16, so that when this base member 34 is adjusted, all of the parts carried thereby are correspondingly adjusted. A similar adjustment could, of course, be effected by means of nuts provided on the other ends of the tie bars 33 and engaging the stationary frame member 34. This machine is of standard and well known construction, and the parts of the machine which have been described, by themselves, constitute no part of this invention.

In order to enable this machine to operate upon objects of a looped or annular form, such for example as steering wheels, which are of greater diameter than the space between the tie rods 33, I have provided means whereby one or more of the tie rods may be replaced by a tie member 40 of arched form, the end portions 41 of which extend transversely to the body portion and are arranged to be secured to the adjustable and stationary machine parts 34 and 35 respectively, by means of short bars 42 and 43, which may be of the same diameter as the tie bars 33, so that my improved arched member 40 may be readily substituted for a tie bar 33. These arched tie members provide a greatly enlarged space transversely of the machine between the die or mold supporting plates 16 and 17 in which wheels, frames or looped articles may be arranged, which extend beyond the dies or molds of the machine, for reasons hereinafter more fully explained. If desired much larger molds may also be used in my improved machine.

Consequently, as clearly shown in Fig. 2, this construction readily permits a comparatively large article, such as a steering wheel, to be positioned so that a part thereof may be operated upon by a relatively small machine.

Any suitable means may be provided for adjusting the adjustable frame member 34 relatively to the arched tie member 40. It is, of course, possible to use shims or spacers (not shown) between the frame or base member 34 and the adjacent transverse part 41 of the tie member 40. In the particular construction illustrated by way of example, I have provided an internally threaded hub or boss on one end of the tie member 40 into which an externally threaded sleeve 38 engages. This sleeve has an aperture or bore of sufficient size to receive the bar 42. Consequently, if it is desired to advance the frame member 34 to the right in Fig. 1, it is only necessary to turn the sleeve 38 to advance the same so that the end thereof engages the frame member 34. By means of a lock nut 39 the sleeve 38 may be secured in its adjusted position. Nuts 44 and 45 engaging threaded portions of the bar 42 hold this bar in fixed relation to the machine. This bar may extend through the hole in the die supporting plate 16 to assist in guiding this plate in its movement. The bars 42 and 43 also reinforce the tie member 40 and enable the same to resist bending due to molding pressure.

It will be noted in referring to Figs. 1 to 3 that the die or mold shown in connection with my improved machine is of such form as to cooperate at one time with a portion only of the article and, after a molding operation, the article may be turned or advanced into another position in which another portion of the thermoplastic material of the article is to be molded. The die is also provided at the ends of the cavity 26 therein with suitable portions 46 which are formed to engage portions of the article to securely clamp the same in correct relation to the cavity in the mold. In case of a wheel these parts of the mold may be formed so as to engage the preformed rim core or base A of the steering wheel, or if desired, the clamping parts of the mold may engage with enlargements or anchoring portions on the rim of the steering wheel for securing the steering wheel in correct relation to the mold, and preferably these enlargements also close the ends of the mold cavity. If desired, the ends of these enlarged portions may be recessed or otherwise formed as to provide parts into which thermoplastic material may flow or embed itself for providing secure anchorages for the ends of the sections of the thermoplastic material. In the construction shown in Figs. 1 to 5 inclusive, the preformed wheel rim core A is provided with enlarged portions 47 arranged at the spokes $a$ of the wheel. These enlarged portions may be formed of metal, in which case they may, for example, be die cast on these portions of the wheel, or if desired, the enlarged portions may be made of thermoplastic material applied by means of the machine described in molds or dies having a corresponding cavity, to portions of the rim of the wheel at the outer ends of the spokes. In the construction shown, the enlarged portions 47 are provided with undercut or recessed end faces 49, but if desired, outwardly extending parts may be provided for anchorages for the final thermoplastic material applied to the wheel rim.

It will be understood, however, that in place of the sectional die shown, a complete die for all of the thermoplastic material to be applied to the article may be used. In such case, the entire die may be turned from one position to another, so that the thermoplastic material may be sectionally molded progressively or step by step, the cavities in the die being such that the thermoplastic material cannot flow from one cavity to another. When a complete die is used, each cavity therein must have its own passage 24 and as the die with the article held therein is moved from one position to another, the several passages 24 are successively brought into position to receive plastic material from the nozzle 25.

In the use of my improved machine, the dies or molds are formed in such a manner that the mold cavity 26 is shaped to form the desired article, which in the case illustrated in Figs. 1 to 5 is a thermoplastic covering about that portion of the rim A which extends into the mold cavity. At the ends of the mold cavity 26, the dies are so formed at the gripping portions 45 as to receive the enlargements 47 and securely grip them. This enables the dies to hold the part of the rim core A in correct position with reference to the die cavity 26 and the enlargements, consequently, also form closures for the ends of the mold cavity.

After the two dies have been brought into engagement by means of the toggle links 18 and cylinder 19, plasticized or semi-liquid thermoplastic material is forced into the die cavity through the passage 24 in the mold until the cavity of the mold is completely filled and the thermoplastic material 50 enters into engagement with the end portions 49 of the enlargements 47. The thermoplastic material is maintained under high pressure in the mold cavity, and since the mold is cooled by suitable means (not shown) the material will solidify to form an envelope or sleeve around that portion of the wheel rim core A extending from one enlargement 47 to the other. When the material has become solidified by cooling, the pressure on the thermoplastic material is interrupted and the die plate 16 is moved away from the plate 17 so that the steering wheel with the molded section thereon may be removed from the dies and turned into another position to have another portion of the preformed rim A positioned in the mold cavity 26 in the same manner as heretofore described in connection with the first portion of the wheel. The operation is then repeated until the three portions of the wheel rim shown in Figs. 1 to 5 are covered with the thermoplastic material. The arch-shaped tie member, as will be readily seen by referring to Figs. 1 and 2, readily permits the wheel to be spaced between this tie bar and the three tie bars 33.

While it is, of course, desirable to construct the tie member 40 approximately as shown, it will be obvious that tie members of other forms than that shown may be employed to provide a transversely enlarged space about the dies or molds. Preferably, the tie member 40 is made of about the same strength or ability to withstand the forces resulting from molding as the tie bars 33, but it is obvious that if the molds or dies are positioned as shown in Fig. 2, so that they extend well within the triangular space between the three tie bars 33, then comparatively little of the molding pressure and of the force exerted by the toggle links 18, will result in forces exerted on the tie member 40. Consequently, this member can be made of less strength than that of any of the tie bars 33.

While I have shown only a single tie member 40, it will be obvious that more than one such tie member may be employed, if desired.

If the enlargements 47 on the wheel are to be made of a thermoplastic material, the depressions or recesses 49 in the ends of the enlargement may be omitted or replaced by corresponding outwardly extending portions and the enlargements 47 may be molded on the wheel in the same or similar machine provided with another set of dies shaped to form the enlargements 47. The covering portions 50 can then be progressively sectionally molded on the wheel rim in the same manner as described.

It is obvious that this machine can be used for sectionally molding a relatively large article without a prefabricated base or core part, such as the rim core A, since articles corresponding to the parts 47 can be clamped in the mold at the ends of the die cavity, whereupon by molding, a part corresponding to the part 50, but without a core, can be molded to the parts held in the mold.

In Figs. 6 to 8 inclusive, I have shown a wheel of modified construction which can be made on my improved machine. In making this wheel, the mold cavity is so formed that the progressively formed sections of thermoplastic material 52 terminate at points approximately intermediate between the spokes. In forming these sections, the gripping portions 46 at the ends of the mold cavity are formed to engage the preformed wheel rim core A and thus form the ends of the sections 52. These ends may, for example, be provided with annular parts or projections 53, as clearly shown in Fig. 7. The mold cavity may also be provided with a portion which forms the thermoplastic material at 54 around the outer ends of the spokes a. The molding of the three sections 52, is effected in a manner similar to that described in connection with the forming of the sections 50, except that these sections will not have their ends abutting against enlargements on the wheel rim. Instead the sections 52 will be spaced from each other. After the sections 52 have been progressively molded on the wheel, the spaces between the ends of the sections can be filled with inserts of any suitable or desired kind. For example, semi-circular inserts 55 and 56 may be provided which fit into the spaces between adjacent sections 52 and these semi-annular inserts may be secured in place by means of a bolt or rivet 57 extending through the same and through a hole in the rim core A.

It is, of course, also possible to produce the article shown in Figs. 6 to 8 by first applying the parts 55 and 56 to the wheel rim A and then molding the sections 52 to the rim as described in connection with Figs. 1 to 5.

In Figs. 9 and 10, I have shown a modified article which may be either in the form of a rim of a steering wheel or of a frame or looped member of a shape which requires more room transversely of the machine than is afforded by machines having four straight tie rods similar to the rods 33. In this case, sleeves or ferrules 60 are provided which may be used as enlargements to cooperate with the gripping parts 46 of the mold and which may form the ends of the mold cavity. These sleeves may be provided on their inner surface with a series of grooves or keyways 61 and 62 extending from the outer ends of the sleeve or ferrule 60 into proximity to the middle portion 63, which is formed for snug or tight engagement with a core 64. After these sleeves or ferrules are correctly and equally spaced on the core or rim 64, the molding of the sections 65 of the thermoplastic material may be progressively effected in the same manner as heretofore described, the mold being so formed that the gripping portions 46 thereof cooperate with the sleeves or ferrules 60 to hold the core member 64 in correct relation to the mold cavity and to close the ends of the same. The hot thermoplastic material then flows under pressure into the grooves or keyways 61 and 62 of the sleeves, which securely anchors the ends of the sections 65.

The particular examples illustrated in the drawings showing prefabricated parts to which the thermoplastic material is molded are, of course, merely illustrative of some of the many forms of devices in connection with which my improved machine may be employed, and it will be obvious that it is not necessary to provide any cores or prefabricated articles, since obviously frames, panels and many other articles of any desired length and of a width greater than the vertical distance between the bars 33 can be made by progressively and sectionally molding, for example, by first molding one section and then advancing it to an end of the mold cavity through the space between the arched tie member 40 and the tie bar 33 below it, then molding another section to the first section, and continuing these operations until an article of the desired length has been produced.

The improved machine described has the advantage that it makes it possible to employ injection or extrusion molding for the purpose of producing articles of greater width and including a much larger quantity of thermoplastic material than the normal capacity of the machine on which the articles are formed. Since the cost of machines of this kind increases very materially as the machines increase in size and capacity, it will be obvious that my improved machine makes it possible to mold articles at a lower cost than heretofore possible, since they can be formed by the use of smaller and less expensive machines. Also since the dies required for progressive sectional molding are smaller than those required for molding large articles, it follows that the cost of producing such large articles on my improved machine is further decreased.

I claim as my invention:

1. A machine for molding thermoplastic material and including a pair of die plates, at least one of which is movable toward and from the other, power operated means for forcing one of said die plates toward the other, parts on said machine which resist the forces resulting from the operation of said power operated means and from the molding operation, a plurality of substantially straight tie bars connecting said parts and extending through apertures in the same, an arched tie member also connecting said parts and having the arched portion thereof extending outwardly beyond the edges of said die plates and having apertured bosses formed at the ends thereof, bars extending through said apertured bosses and through apertures in said force resisting parts for connecting said arched tie member to said parts, said bars extending toward each other and having their adjacent ends spaced apart in the space between said die plates.

2. A machine for molding thermoplastic material and including a pair of die plates, at least one of which is movable toward and from the other, power operated means for forcing one of said die plates toward the other, parts on said machine which resist the forces resulting from the operation of said power operated means and from the molding operation, a plurality of substantially straight tie bars connecting said parts and extending through apertures in the same, an arched tie member also connecting said parts and having the arched portion thereof extending outwardly beyond the edges of said die plates, means for connecting one end of said arched tie member to one of said force resisting parts, and an adjustable connection between the other end of said tie member and the other of said force resisting parts for permitting said parts to be adjusted toward and from each other.

3. A machine for molding thermoplastic material and including a pair of die plates, at least one of which is movable toward and from the other, power operated means for forcing one of said die plates toward the other, parts on said machine which resist the forces resulting from the operation of said power operated means and from the molding operation, a plurality of substantially straight tie bars connecting said parts and extending through apertures in the same, an arched tie member also connecting said parts and having the arched portion thereof extending outwardly beyond the edges of said die plates, means for connnecting one end of said arched tie member to one of said force resisting parts, and an adjustable connection between the other end of said arched tie member and the other of said force resisting parts and including a threaded cylindrical member having a threaded engagement with said arched tie member and bearing against said other force resisting part to permit adjustment of said parts toward and from each other.

4. A machine for molding thermoplastic material and including a pair of die plates, at least one of which is movable toward and from the other, power operated means for forcing one of said die plates toward the other, parts on said machine which resist the forces resulting from the operation of said power operated means and from the molding operation, a plurality of substantially straight tie bars connecting said parts and extending through apertures in the same, and through apertures in said die plates for guiding said movable guide plate in its movement relatively to the other guide plate, an arched tie member also connecting said parts and having the arched portion thereof extending outwardly beyond the edges of said die plates, means for connecting one end of said arched tie member to one of said force resisting parts, and an adjustable connection between the other end of said tie member and the other of said force resisting parts and including a cylindrical bar extending through apertures in said last mentioned force resisting part and said movable die plate to assist in guiding the movement of said movable die plate, and an externally threaded sleeve arranged about said bar and having an adjustable threaded engagement with said arched tie member and bearing against said other force resisting part to permit adjustment of said force resisting parts relatively to each other without materially varying the position of said bar relatively to said machine.

JOHN B. TEGARTY.